US010158582B2

(12) United States Patent
Hernandez et al.

(10) Patent No.: US 10,158,582 B2
(45) Date of Patent: Dec. 18, 2018

(54) DEVICE-TO-DEVICE COMMUNICATION FOR RESOURCE SHARING

(71) Applicant: INTEL CORPORATION, Santa Clara, CA (US)

(72) Inventors: Thomas J. Hernandez, Portland, OR (US); Gustavo D. Domingo Yaguez, Cordoba (AR); Marci Meingast, Berkley, CA (US); Aras Bilgen, Istanbul (TR); Davi I. Shaw, Portland, OR (US); Gautham N. Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 14/828,301

(22) Filed: Aug. 17, 2015

(65) Prior Publication Data

US 2016/0105375 A1    Apr. 14, 2016

Related U.S. Application Data

(63) Continuation of application No. 13/997,636, filed as application No. PCT/US2013/031008 on Mar. 13, 2013, now Pat. No. 9,112,884.

(51) Int. Cl.
*G06F 15/16*    (2006.01)
*H04L 12/911*   (2013.01)
(Continued)

(52) U.S. Cl.
CPC ............ *H04L 47/82* (2013.01); *G06F 21/335* (2013.01); *G06F 21/445* (2013.01);
(Continued)

(58) Field of Classification Search
CPC .... H04L 29/06; H04L 29/08072; G06F 21/34
(Continued)

(56) References Cited

U.S. PATENT DOCUMENTS 7,546,373 B2    6/2009  Lehew et al.
7,590,684 B2 *  9/2009  Herrmann ............... H04L 63/08
                                                   709/203
(Continued)

FOREIGN PATENT DOCUMENTS

CN    102448196 A    5/2012
CN    102549574 A    7/2012

OTHER PUBLICATIONS

International Search Report and Written Opinion dated Dec. 24, 2013 for International Application No. PCT/US2013/031008, 13 pages.
(Continued)

*Primary Examiner* — Khanh Q Dinh
(74) *Attorney, Agent, or Firm* — International IP Law Group, P.L.L.C.

(57)    ABSTRACT

Embodiments of techniques and systems associated with device-to-device (D2D) resource sharing are described. In some embodiments, a D2D communication channel between a first device and a second device is established and a sharing request is received at the first device, from the second device, including a credential identifying the second device. Data representative of a first resource locally available to the first device, but not locally available to the second device, is provided to the second device by the first device. Use of the first resource may be controlled in accordance with an instruction transmitted to the first device from the second device. Other embodiments may be described and/or claimed.

30 Claims, 12 Drawing Sheets

(51) Int. Cl.

| | | |
|---|---|---|
| *H04L 29/08* | (2006.01) | |
| *H04W 4/12* | (2009.01) | |
| *H04W 76/14* | (2018.01) | |
| *H04L 29/06* | (2006.01) | |
| *G06F 21/33* | (2013.01) | |
| *G06F 21/44* | (2013.01) | |
| *H04W 12/04* | (2009.01) | |
| *H04W 76/02* | (2009.01) | |
| *H04W 72/04* | (2009.01) | |

(52) U.S. Cl.
CPC ...... *H04L 29/08072* (2013.01); *H04L 63/061* (2013.01); *H04L 63/101* (2013.01); *H04L 63/18* (2013.01); *H04L 65/1069* (2013.01); *H04L 67/1076* (2013.01); *H04W 4/12* (2013.01); *H04W 12/04* (2013.01); *H04W 72/0406* (2013.01); *H04W 76/023* (2013.01); *H04W 76/14* (2018.02)

(58) Field of Classification Search
USPC ......... 709/220, 224, 227, 232, 203; 455/411
See application file for complete search history.

(56) References Cited

U.S. PATENT DOCUMENTS

| | | | |
|---|---|---|---|
| 7,762,470 | B2 | 7/2010 | Finn et al. |
| 8,510,808 | B2 | 8/2013 | McNeil et al. |
| 8,997,195 | B1 | 3/2015 | Fadida et al. |
| 9,178,857 | B2* | 11/2015 | Counterman ........... H04L 63/08 |
| 9,432,373 | B2* | 8/2016 | Ryder ..................... H04L 63/10 |
| 2004/0167984 | A1* | 8/2004 | Herrmann ............... H04L 63/08 709/229 |
| 2005/0198029 | A1 | 9/2005 | Pohja et al. |
| 2008/0263235 | A1 | 10/2008 | Hans et al. |
| 2009/0111378 | A1 | 4/2009 | Sheynman et al. |
| 2010/0167646 | A1 | 7/2010 | Alameh et al. |
| 2011/0070864 | A1* | 3/2011 | Karam ..................... G06F 21/34 455/411 |
| 2011/0081923 | A1 | 4/2011 | Forutanpour et al. |
| 2011/0265157 | A1* | 10/2011 | Ryder ..................... H04L 63/10 726/6 |
| 2011/0275316 | A1 | 11/2011 | Suumaki et al. |
| 2012/0038550 | A1* | 2/2012 | Lemmey .................. G06F 3/017 345/156 |
| 2012/0197988 | A1 | 8/2012 | Leppanen et al. |
| 2012/0272162 | A1* | 10/2012 | Surin ....................... H04L 67/38 715/753 |
| 2012/0330769 | A1* | 12/2012 | Arceo ...................... G06Q 20/32 705/21 |
| 2012/0331059 | A1 | 12/2012 | Luna |
| 2016/0212134 | A1* | 7/2016 | Ryder ..................... H04L 63/10 |
| 2017/0148060 | A1* | 5/2017 | Showers .................. G06Q 30/02 |

OTHER PUBLICATIONS

Kinzhalin, Arzhan et al., "Enabling dynamic data centers with a smart bare-metal server platform", Mar. 13, 2010, 14 pages.
WiFi Alliance, "Wi-Fi Certified Miracast (TM): Extending the Wi-Fi Experience to Seamless Video Display", Wi-Fi Alliance, XP-002700078, Sep. 19, 2012, USA, 18 pages.
EP Search Report, EP Application No. 13878142, date of completion Aug. 19, 2016, 2 pages.

* cited by examiner

DEVICE-TO-DEVICE COMMUNICATION FOR RESOURCE SHARING

CROSS REFERENCE TO RELATED APPLICATIONS

The present application is a continuation application of Ser. No. 13/997,636, filed Jun. 24, 2013, now U.S. Pat. No. 9,112,884, which is a national phase entry under 35 U.S.C. § 371 of International Application No. PCT/US2013/031008, filed Mar. 13, 2013, entitled "DEVICE-TO-DEVICE COMMUNICATION FOR RESOURCE SHARING", which designated, among the various States, the United States of America. The Specification of the PCT/US2013/031008 Application is hereby incorporated by reference.

TECHNICAL FIELD

The present disclosure relates generally to the field of electrical devices, and more particularly, to techniques and systems associated with sharing of resources between devices.

BACKGROUND

Existing architectures for sharing the resources of multiple devices often rely on a central server system for accessing the resources and allocating the resources to users of the devices. For example, cloud computing systems rely on an Internet communication interface to connect users with resources of the cloud devices. Private networks (e.g., within a business or other institution) similarly rely on central servers. Some network architectures are distributed (e.g., ad hoc sensor networks) but such architectures are typically configured for transmitting information from each of the distributed devices, and do not allow the devices to share control of device resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
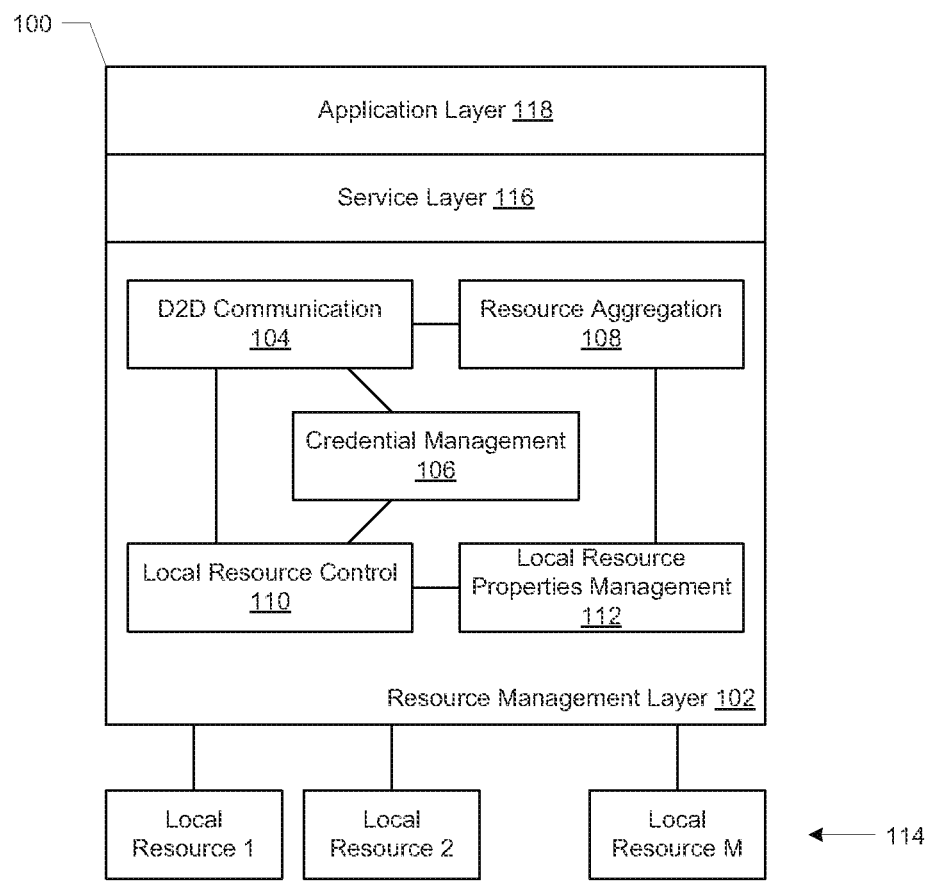
FIG. 1 is a block diagram illustrating an example D2D resource sharing device, in accordance with various embodiments.

Embodiments of techniques and systems associated with device-to-device (D2D) resource sharing are described. In some embodiments, a D2D communication channel between a first device and a second device is established and a sharing request is received at the first device, from the second device, including a credential identifying the second device. Data representative of a first resource locally available to the first device, but not locally available to the second device, is provided to the second device by the first device. Use of the first resource may be controlled in accordance with an instruction transmitted to the first device from the second device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the terms "module" and "logic" may refer to, be part of, or include an Application Specific Integrated Circuit (ASIC), an electronic circuit, a processing device (shared, dedicated, or group) and/or memory (shared, dedicated, or group) that execute one or more software or firmware programs, a combinational logic circuit, and/or other suitable components that provide the described functionality.

The term "device," as used herein, may include one or more wireless or wired electronic components such as a desktop computer, a laptop computer, a handheld computer, a tablet computer, a server, a cellular telephone, a pager, an audio and/or video player (e.g., an MP3 player or a DVD player), a gaming device, a video camera, a digital camera, a navigation device (e.g., a GPS device), a "peripheral" (e.g., a printer, a scanner, a headset, a keyboard, a mouse, etc.), a medical device (e.g., a heart rate monitor, a blood pressure monitor, etc.), and/or other fixed, portable, or mobile electronic devices. Devices may communicate with each other (referred to as device-to-device or D2D communication) in any of a number of ways, including Universal Serial Bus (USB) connections, wireless near-field communication (NFC) protocols, or any of a number of other wired or wireless communication modalities. The term "constellation," as used herein, may refer to a collection of two or more devices, each configured to share resources with at least one other device in the collection. Communication between various pairs of devices in a constellation may take place using different communication modalities for different pairs, or may be constrained to a single common modality. As used herein, the term "resource" may refer to a hardware, firmware, or software component, or a combination of two or more of such components, whose functionality may be used by a device. For example, a video camera "device" may have video recording, audio recording, image processing and storage "resources." In another example, a laptop computer "device" may have a sensor interface "resource" and an accelerometer "resource" coupled to the laptop computer via the sensor interface.

As used herein, the terms "local" and "remote" may refer to relationships between resources and devices, and between devices. A resource local to a device may be controlled by and/or in communication with the device, without use of the resource sharing systems and/or techniques described herein. Examples of resources local to a device may include resources embedded in the device (e.g., one or more processing devices, such as processor cores, embedded in a computing device), resources controlled by the device through a wireless, NFC path (e.g., a headset in communication with a smartphone via a Bluetooth protocol), and resources coupled to the device via a USB, parallel port, or other wired or peripheral protocol (e.g., an electronic effects pedal in wired communication with an electric guitar device). A device that is local to a resource may be referred to as the "owner" of the resource. A resource may have more than one owner device, and an owner device may be associated with more than one resource. A resource remote to a device may not be controlled by and/or in communication with the device without going through an intermediate device that is an owner of that resource, without use of the resource sharing systems and/or techniques described herein. A resource local to a remote device may be referred to as a "remote resource." As used herein, "resources" may include physical and/or virtual resources, and "devices" may include physical and/or virtual devices. As used herein, "control" of a resource may include access to or receipt of data associated with the resource (e.g., access to video data generated by a digital video camera).

Referring now to FIG. 1, an example D2D resource sharing device 100 is illustrated, in accordance with various embodiments. Device 100 may be or may include any one or more of the devices described above, such as a smartphone or a tablet computer. Device 100 may own local resources 114 which, as discussed above, may include one or more hardware, firmware, and/or software components. As discussed in detail below, device 100 may be configured to share some or all of local resources 114 with other, similarly-configured D2D resource sharing devices. In some embodiments, this sharing may take place over D2D communication channels established between device 100 and each of the other devices (without the assistance of a central coordinating server). In some embodiments, this sharing may take place over communication channels established between device 100 and each of the other devices with the assistance of one or more coordinating servers (which may be remote to device 100). Additionally, information about local resources 114 may be provided to and processed by the other devices so that applications running on the other devices are able to control local resources 114 as if they were local to the other devices.

In some embodiments, device 100 may include application layer 118, service layer 116 and resource management layer 102. In general, each layer of device 100 may process information about available resources and provide the processed information to one or more layers above it, thereby allowing the higher layers to operate at higher levels of abstraction with regard to the available resources. One or more applications may execute in application layer 118 and may draw on resource information provided by service layer 116. In some embodiments, service layer 116 may be a mobile operating system (OS) service layer. In turn, service layer 116 may process resource information provided by resource management layer 102. In some embodiments, resource management layer 102 may manage access by service layer 116 and/or application layer 118 to local resources 114 and/or remote resources (not shown). In some embodiments, resource management layer 102 may notify service layer 116 when changes in available resources occur. Service layer 116 may notify currently active or future applications running in application layer 118 of resource changes so that the applications may, for example, adapt to the addition of new resources and utilize them as if the resources were local to device 100. For example, in some embodiments, application layer 118 may register a callback when resource management layer 102 determines that a resource is newly available, is no longer available, has had a change in one or more properties, or under any other suitable condition.

Resource management layer 102 may include D2D communication module 104. D2D communication module 104 may be coupled to credential management module 106, resource aggregation module 108, and local resource controller 110. In some embodiments, D2D communication module 104 may be configured for receiving a sharing request from a remote device (not shown). The sharing request may represent a request from the remote device to initiate a session to share resources. This "sharing" may take the form of the use (and/or offer of use) of one of local resources 114 by the remote device, the use (and/or offer of use) of a resource local to the remote device by device 100, or a combination of both. As used herein, the "control" of a device may include D2D communication module 104 may receive a sharing request via one or more wired or wireless communications components, such as one or more antennas.

In some embodiments, a sharing request may be triggered by one or more actions, such as an NFC tap, a change of location of the requesting device (as determined, e.g., by a global positioning system (GPS) device or an accelerometer), an infrared-based ping query between the devices, etc. In some embodiments, the trigger action may be user configurable (e.g., through a user interface on the requesting device, such as a keypad, touchscreen, or other interface). In some embodiments, a sharing request from a device may include credential data which may, for example, identify the device. Various embodiments of sharing requests are discussed below with reference to credential management module 106 and with reference to FIGS. 2 and 15. In some embodiments, a sharing request may be transmitted separately from credential data.

D2D communication module 104 may also be configured for establishing a D2D communication channel between device 100 and a remote device, for transmitting information and instructions to the remote device via the D2D communication channel, and/or for receiving information and instructions from the remote device via the D2D communication channel. In some embodiments, a D2D communication channel may be a private secure channel between two devices over which resource sharing information and instructions may be transmitted. A private secure channel may be established between two devices in accordance with any suitable technique known in the art. For example, in some embodiments, a Secure Socket Layer (SSL) protocol and/or a Transport Layer Security (TLS) protocol (e.g., with mutual authentication) may be used. In some such embodiments, an encrypted channel may be established between two devices, and the devices may authenticate each other using X.509 certificates or another public-private key authentication scheme.

Resource management layer 102 may include credential management module 106. Credential management module 106 may be coupled to D2D communication management module 104 and local resource control module 110. In some embodiments, credential management module 106 may be configured for providing and/or receiving credentials for identifying, authenticating, and/or authorizing the sharing of resources between device 100 and one or more remote devices. For example, credential management module 106 may be configured for receiving, from a remote device, a credential that identifies the remove device and that may be used to enable the remote device to control one or more of local resources 114 via instructions transmitted from the remote device to device 100 (via a D2D communication channel established by D2D communication management module 104). In some embodiments, credential data from a device may include a unique device name, serial number, or other identifier. In some embodiments, credential data managed by credential management module 106 may identify a remote device as belonging to an authorized group of devices with which sharing may take place (e.g., a group of devices owned by a common organization, or made available to each other via a sharing agreement).

In some embodiments, a credential may include an encryption key, a security certificate, a password, or other data that the remote device may use to signal to device 100 that the remote device is or should be authorized by device 100 to share local resources 114 (or a subset thereof). In some embodiments, a credential may authenticate the identity of a device in accordance with known techniques for automatically secured D2D communication. For example, credential management module 106 may generate a character string, and may authorize a remote device to share local resources 114 when the remove device provides that character string to device 100 as a credential. In some embodiments, device 100 and the remote device must be in physical proximity to allow visual transfer of the character string (e.g., by having a camera of the remote device capture the character string from a display of device 100, or by having a user of the remote device view a display of device 100 and manually enter the character string using a keyboard of the remote device). In some embodiments, credential data provided by a remote device may be accompanied by data representative of shareable resources local to the remote device; in other embodiments, data representative of shareable resources may be provided separately from credential data. Such latter embodiments may advantageously minimize wasted data transfer when, for example, a remote device's credentials are not accepted by device 100 and thus sharing will be prohibited.

In some embodiments in which a constellation of three or more devices are sharing resources in some combination, one or more of the devices in the constellation may serve as central credential management entities, and may maintain credential data and make credential determinations for the entire constellation. In some embodiments, such central credential management entities may synchronize credential data among the devices in the constellation on a synchronous or asynchronous basis. In some embodiments, a session token may be supplied to establish a secure session for resource sharing; other session attributes (such as a list of current devices in the constellation, refreshed authentication credentials lists, etc.) may also be supplied as part of establishing the session. Depending on the degree of robustness desired for the constellation, a device added to the constellation may serve as a mesh or ring network node as well, so as to help maintain the constellation if other devices exit the constellation.

Credential management module 106 may also be configured, along with D2D communication module 104 and resource aggregation module 108 (discussed below), to manage the process of one or more remote devices leaving a resource sharing arrangement with device 100 and thus the loss of one or more remote resources. For example, in some embodiments, credential management module 106 may, along with resource aggregation module 108, provide an "exit event" to application layer 118 when a remote device and/or resource is no longer accessible to device 100 (e.g., because the remote device loses power, or is dropped and breaks). The exit event provided to application layer 118 may be provided in a manner similar to existing techniques for managing "hot plug" devices (such as smart cards or server storage racks).

Resource management layer 102 may include resource aggregation module 108. Resource aggregation module 108 may be coupled to D2D communication module 104 and local resource properties management module 112. In some embodiments, D2D communication module 104 may receive, from a remote device, data representative of a resource locally available to the remote device but not locally available to device 100. In such embodiments, resource aggregation module 108 may be configured to provide, to another layer in device 100 (e.g., service layer 116), a representation of this resource as a local resource available for use by device 100. For example, in embodiments in which resource aggregation module 108 provides a representation of a non-local resource (e.g., a resource local to a remote device) to service layer 116, the non-local resource may appear to service layer 116 as a local resource available for use by service layer 116 and/or other layers such as application layer 118.

Service layer 116 and/or application layer 118 may provide instructions for control of the non-local resource as if the non-local resource were local to device 100. In some embodiments, resource management layer 102 may intercept these instructions and route them to the appropriate local component (e.g., local resource control module 110, discussed below) or remote device. In some embodiments, resource aggregation module 108 may abstract the mechanisms and internal details required to use a local or remote resource, and present resources as virtual resources using a standard application programming interface (API). For example, in some embodiments, resource aggregation module 108 may expose itself as a device driver (e.g., when some or all resources are usually exposed via device drivers, such as hard drive resources). Other existing programming APIs may be used. In some embodiments, service layer 116 may embody one or more such standardized APIs (e.g., Open Device, Read, Write, etc.) to access resources. Resource management layer 102 may then implement the API by parsing and routing more primitive commands to the targeted resource. Some embodiments may "virtualize" a resource by making it appear that a single resource can be "owned" by multiple clients or exists as multiple instances. In some embodiments, a remote resource meant to appear as a local resource could also be so virtualized; as such, remote resource virtualization may occur before aggregation and/or standard resource virtualization takes place. A remote resource may have a local "proxy" equivalent that, when accessed, routes resource interaction requests to the remote device.

In some embodiments, resource aggregation module 108 may be configured for aggregating information about multiple ones of local resources 114 that are of a same type and providing a representation of an aggregate resource to another layer in device 100 (e.g., service layer 116) or to another device (such as a remote device). In some embodiments, resource aggregation module 108 may be configured for aggregating information about one or more of local resources 114 and one or more resources of a same type that are local to a remote device (but not local to device 100), and providing a representation of an aggregate resource to another layer in device 100 or to another device. In some embodiments, resource aggregation module 108 may be configured for aggregating information about one or more resources of a same type that are local to different remote devices (but not local to device 100), and providing a representation of an aggregate resource to another layer in device 100 or to another device. In some embodiments, resource aggregation module 108 may be configured for providing a representation of an aggregate resource based on any combination of resources available locally to device 100 or any of its remote devices. Various embodiments of techniques for determining type and aggregating resources are discussed below (e.g., with reference to FIG. 18).

Resource management layer 102 may include local resource control module 110. Local resource control module 110 may be coupled to D2D communication module 104, credential management module 106 and local resource properties management module 112. In some embodiments, local resource control module 110 may be configured for determining that a remote device is or should be authorized to control one or more of local resources 114. In some embodiments, this determination may be based on one or more credentials received from the remote device (and processed or otherwise stored by credential management module 106). Credential management module 106 may also store data representative of which remote devices are authorized to access which (if any) of local resources 114. Such information may be referred to herein as an access control list (ACL), which may be stored in a memory associated with local resource control module 110. In some embodiments, an ACL may be associated with a single remote device and may identify which of local resources 114 the remote device is authorized to control (as well as any conditions on that control, such as read-only, write-only, or read-write). In some embodiments, an ACL may be associated with a class of remote devices (e.g., all smartphones). In some embodiments, a single ACL may be associated with any remote device which is properly authenticated for resource sharing with device 100. Credential management module 106 may further store information about the relative priority of various remote devices in using various ones of local resources 114.

In some embodiments, local resource control module 110 may be configured for controlling use of one or more of local resources 114 in accordance with instructions transmitted to device 100 from one or more remote devices authorized to control the one or more local resources 114, or from layers of device 100 such as service layer 116 and/or application layer 118. Local resource control module 110 may receive information about which remote devices are authorized to control which of local resources 114 from credential management module 106, and in some embodiments, may use this information to determine which instructions received from remote devices via D2D communication module 104 are to be executed. In some embodiments, D2D communication module 104 evaluates whether instructions are authorized in accordance with information stored in credential management module 106 prior to passing instructions to local resource control module 110.

Resource management layer 102 may include local resource properties management module 112. Local resource properties management module 112 may be coupled to resource aggregation module 108 and local resource control module 110. In some embodiments, local resource properties management module 112 may include memory to store data about properties of one or more of local resources 114. That data may be used by resource aggregation module 108 to determine how to represent local resources 114 to other layers (such as service layer 116 and/or application layer 118) and/or to remote devices, and how to aggregate local resources 114 among themselves and/or with resources not local to device 100. In some embodiments, data about properties of one or more of local resources 114 may be provided to local resource controller 110 prior to executing a received instruction to ensure that the local resource targeted by the instruction has the properties required or desired for proper execution of the instruction.

One example of data representative of one or more of local resources 114 may include data representative of current or past usage of a local resource. Another example is an indicator of the "stickiness" of a particular property; whether that particular property (e.g., a calibration factor of a medical device, or a baseline value for a sensor) is subject to change when a particular device (e.g., the device 100 or a remote device) ceases to control the resource. In some embodiments, one or more properties of each local resource 114 are included in a resource property manifest stored in local resource properties management module 112. Various embodiments of local resource properties that may be stored in local resource properties management module 112 are discussed below (e.g., with reference to FIG. 14).

In some embodiments, applications and/or other processes executing on device 100 (e.g., in service layer 116 and/or application layer 118) may be designed or optimized for use with resources that may be not be consistently available (e.g., local resources that are shared with other devices, or remote resources which may become unavailable when their owner device stops sharing the remote resource.) Such processes may, for example, perform processing operating in smaller batches to reduce the probability of a disruption in the middle of a batch and improve the ability of the process to move operating to available resources.

Referring now to FIGS. 2-13, schematic illustrations of an example D2D resource sharing scenario are provided, in accordance with various embodiments. The scenario of FIGS. 2-13 is intended to illustrate various aspects of the operation of embodiments of the D2D resource sharing techniques and systems described herein, and is not limiting of the operation of the disclosed techniques and systems.

Figure 2:
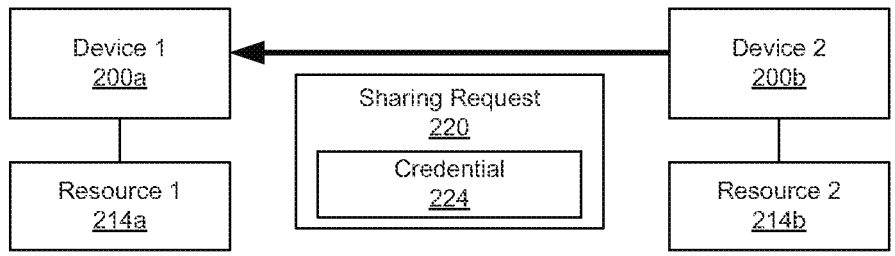
FIGS. 2-13 are schematic illustrations of an example D2D resource sharing scenario, in accordance with various embodiments.

FIG. 2 depicts two devices: device 1 200a and device 2 200b. Device 1 200a and device 2 200b may be remote from each other. Device 1 200a and device 2 200b may be any number of different devices, such as any of the devices described above. For example, in some embodiments, device 1 200a includes a personal computing device and device 2 200b includes a personal computing device, a camera, and/or a musical instrument. In some embodiments, device 1 200a and device 2 200b may be two devices belonging to a common individual or family, or may be managed in a common enterprise environment. In some embodiments, device 1 200a and device 2 200b may belong to different users who wish to use the devices to play a multi-player game.

In FIG. 2, device 1 200a owning resource 1 214a is shown as receiving sharing request 220 from device 2 200b. Sharing request 220 may include credential 224, which may identify device 2 200b to device 1 200a. Device 1 200a and device 2 200b may be configured as described above for device 100 of FIG. 1. In particular, each of device 1 200a and device 2 200b may have a resource management layer configured as described above for resource management layer 102 of FIG. 1. Sharing request 220 may be transmitted to device 1 200a from device 2 200b over a D2D communication channel.

Figure 3:
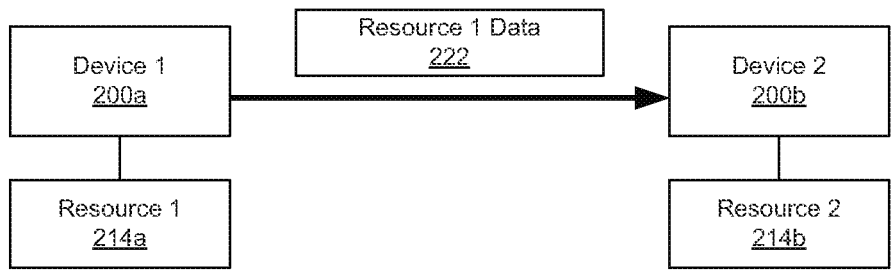

In FIG. 3, device 1 200a is shown as providing data 222, representative of resource 1 214a, to device 2 200b. Data 222 may be derived from, for example, an ACL associated with device 2 200b, associated with resource 1 214a, or both. Data 222 and credential 224 may be transmitted from device 1 200a to device 2 200b over a D2D communication channel.

Figure 4:
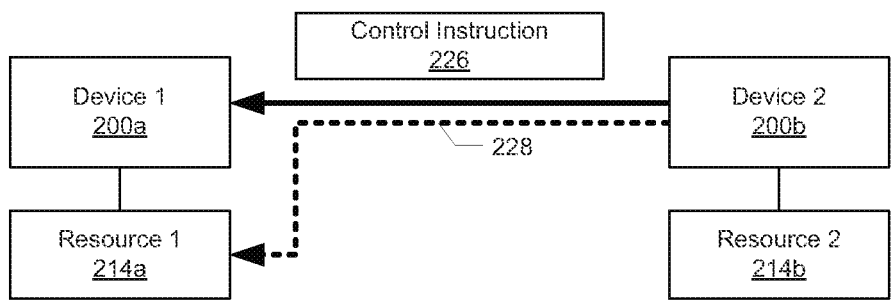

In FIG. 4, device 1 200a is shown as receiving an instruction 226 from device 2 200b to control the use of resource 1 214a. Instruction 226 may be transmitted to device 1 200a from device 2 200b over a D2D communication channel. In some embodiments, although resource 1 214a is not local to device 2 200b, a resource management layer included in device 2 200b (such as resource management layer 102 of FIG. 1) may provide a representation to a service and/or application layer of device 2 200b so that resource 1 214a appears to the service and/or application layer to be local to device 2 200b. As such, from the perspective of the service and/or application layer of device 2 200b, control of resource 1 214a may appear to be direct control of a local resource, as represented by dotted arrow 228. In some embodiments, control instruction 226, as transmitted to device 1 200a, may be substantially similar to a control instruction that would be transmitted by a service and/or application layer of device 2 200b if resource 1 214a were local to device 2 200b. In some such embodiments, device 1 200a may act substantially as a conduit of control instruction 226, passing the instruction to a controller of resource 1 214a (e.g., local resource controller 110 of FIG. 1) for execution.

In some embodiments, when resource 1 214a generates data in response to executing control instruction 226, the data is transmitted from device 1 200a to device 2 200b in substantially the same form as generated by resource 1 214a. When a service and/or application layer of device 2 200b receives this data, the data appears to have come directly from a local resource. For example, in some embodiments, resource 1 214a may be an electronic keyboard configured to generate musical instrument digital interface (MIDI) data when keys are depressed. When device 2 200b is in control of resource 1 214a, this MIDI data may be routed through device 1 200a and to device 2 200b substantially unchanged; from the perspective of device 2 200b, the electronic keyboard is owned by device 2 200b. Embodiments in which a device may control a remote resource using "raw" instructions interpretable by the remote resource (instead, for example, of providing an instruction in a form that must be interpreted and translated by an application executing on the owner device) may improve the granularity with which a device may control a remote resource, thereby allowing a fuller range of control. Similarly, embodiments in which a device may receive data generated by the remote resource in a substantially "raw" form may improve the granularity with which the device may interpret and respond to the data.

In some embodiments, the control instruction of FIG. 4 may be provided in response to a request by an application or other process executing on device 2 200b for resource 1 214a or a resource similar to resource 1 214a. For example, an application executing on device 2 200b may require (or desire) additional processing power during a computationally intensive operation. In some such embodiments, device 2 200b may respond to this requirement or desire by determining whether any remote resources (such as resource 1 214a) may be available to service the requirement or desire (e.g., via a resource management layer such as resource management layer 108 of FIG. 1). If a remote resource is available, device 2 200b may utilize the remote resource as if it were local. In some embodiments, the requesting application or process may be unaware of the origin of the resource. In another example, an application executing on device 2 200b may identify a specific remote resource that it wishes to use (e.g., a specialized piece of laboratory equipment owned by another university). In some such embodiments, a resource management layer (such as resource management layer 108 of FIG. 1) may communicate with the owner device of the identified remote resource for control of the identified remote resource.

Figure 5:
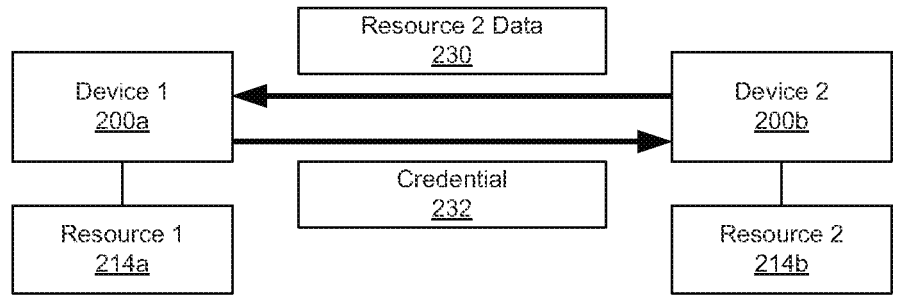

In FIG. 5, device 2 200b is shown as providing data 230, representative of resource 2 214b, to device 1 200a. Device 1 200a is shown as providing credential 232 to device 2 200b. Data 230 and credential 232 may be transmitted between device 2 200b and device 1 200a over a D2D communication channel. In some embodiments, device 2 200b may provide data 230, and device 1 200a may provide credential 232, as part of a mutual credentialing process that may include device 1 200a providing data 222 and device 2 200b providing credential 224 (as shown in FIGS. 2 and 3). In some embodiments, data 230 and/or credential 232 may be provided to device 1 200a in response to a sharing request transmitted from device 1 200a to device 2 200b (not shown). In some embodiments, a mutual credentialing process may be triggered by a sharing request transmitted by one or both of device 1 200a and device 2 200b. In some embodiments, a sharing request may include credential data.

Figure 6:
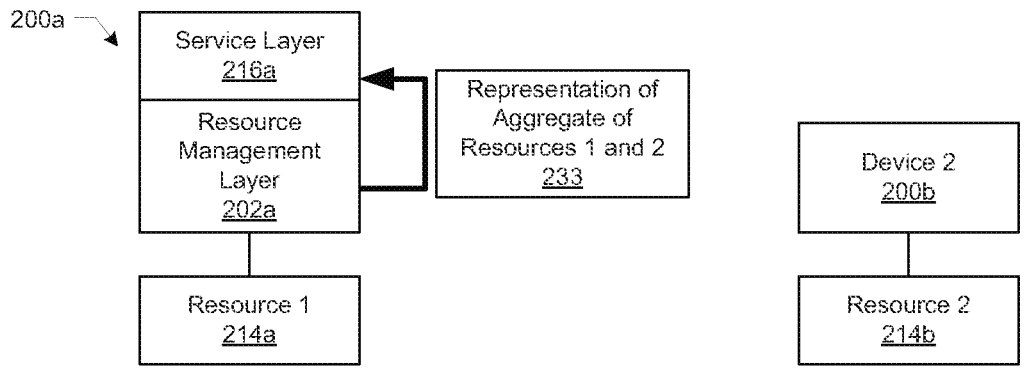

As discussed above, in some embodiments, resources local to different remote devices may be aggregated and presented as an aggregate resource. In some embodiments, this aggregation occurs when the resources are of a same or similar type such that treatment as an aggregate resource is possible or suitable. For example, if resource 1 214a is a storage device with a capacity of 5 GB, and resource 2 214b is a storage device with a capacity of 3 GB, resource 1 214a and resource 2 214b may be aggregated and represented as a single aggregate storage device with a capacity of 8 GB. FIG. 6 illustrates the representation of an aggregation. In particular, in FIG. 6, device 1 200a is expanded to show its component service layer 216a and resource management layer 202a. Service layer 216a may be configured as described above for service layer 116 of FIG. 1, and resource management layer 202a may be configured as described above for resource management layer 102 of FIG. 1. Resource management layer 202a is shown as providing, to service layer 216a of the device 1 200a, a representation 233 of an aggregation of resource 1 214a and resource 2 214b as an aggregate local resource available for use by service layer 216a. Using the storage device aggregation example from above, because of representation 233, resource 1 214a and resource 2 214b may appear to service layer 216a as a single local storage device with a capacity of 8 GB.

Figure 7:
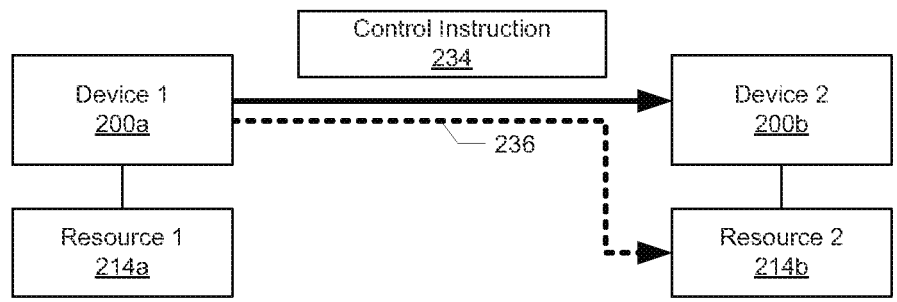

In FIG. 7, device 1 200a is shown as providing instruction 234 to device 2 200b to control the use of resource 2 214b. Instruction 234 may be transmitted to device 2 200b from device 1 200a over a D2D communication channel. In some embodiments, instruction 234 is based on a first instruction provided by a service or application layer of device 1 200a; the first instruction may be routed to the appropriate device (e.g., device 1 200a or device 2 200b) to which the desired resource is local. When a resource is aggregated, a resource aggregation module in a resource management layer (such as resource aggregation module 108 of resource management layer 102 of FIG. 1) may determine to which one or more device the instruction is most properly routed (based on, for example, the demand on various devices, the priority of the requesting device among other remote devices, etc.). As discussed above, from the perspective of the service and/or application layer of device 1 200a, control of resource 2 214b may appear to be direct control of a local resource, as represented by dotted arrow 236.

Figure 8:
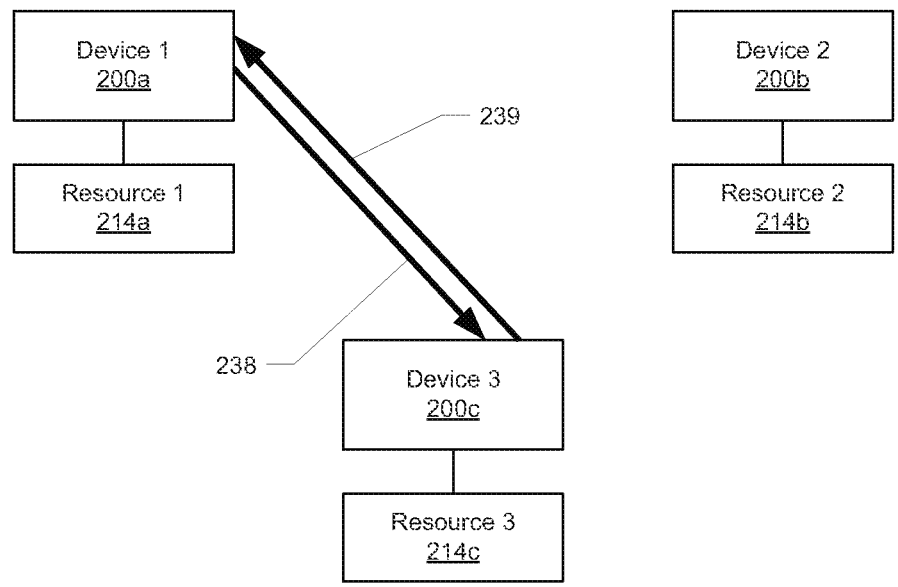

In FIG. 8, device 1 200a is shown as receiving sharing request 239 from device 3 200c. Sharing request 239 may include credential data identifying device 3 200c. Device 3 200c may be configured as described above for device 100 of FIG. 1. Device 1 200a is also shown in FIG. 8 as providing data 238, representative of resource 1 214a, to device 3 200c. Data 238 may be transmitted to device 3 200c from device 1 200a over a D2D communication channel. In some embodiments, device 3 200c may perform a similar exchange of data with device 2 200b over a D2D communication channel between device 3 200c and device 2 200b.

Figure 9:
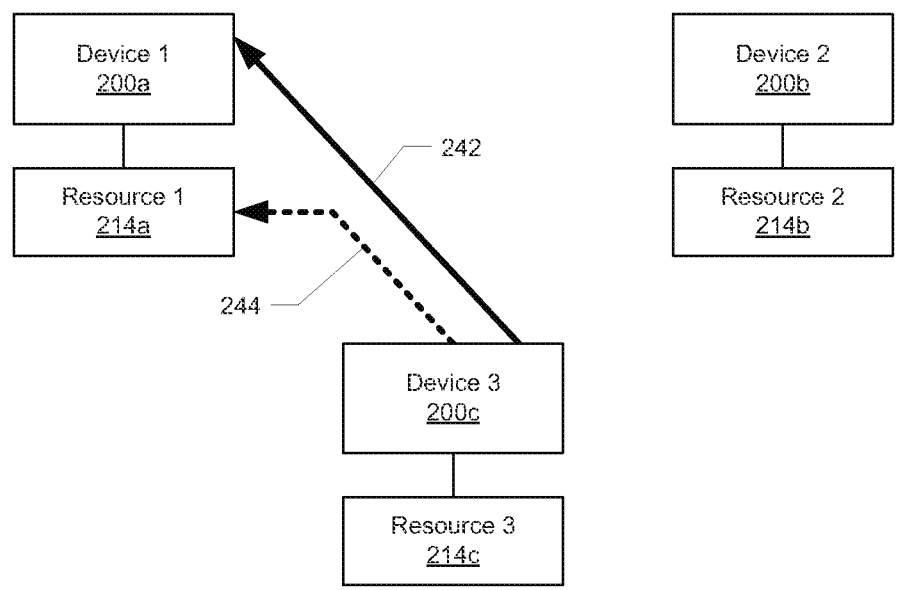

In FIG. 9, device 1 200a is shown as receiving an instruction 242 from device 3 200c to control the use of resource 1 214a. Instruction 242 may be transmitted to device 1 200a from device 3 200c over a D2D communication channel. As discussed above with reference to FIG. 4, although resource 1 214a is not local to device 3 200c, a resource management layer included in device 3 200c (such as resource management layer 102 of FIG. 1) may provide a representation to a service and/or application layer of device 3 200c so that resource 1 214a appears to the service and/or application layer to be local to device 3 200c. As such, from the perspective of the service and/or application layer of device 3 200c, control of resource 1 214a may appear to be direct control of a local resource, as represented by dotted arrow 244.

Figure 10:
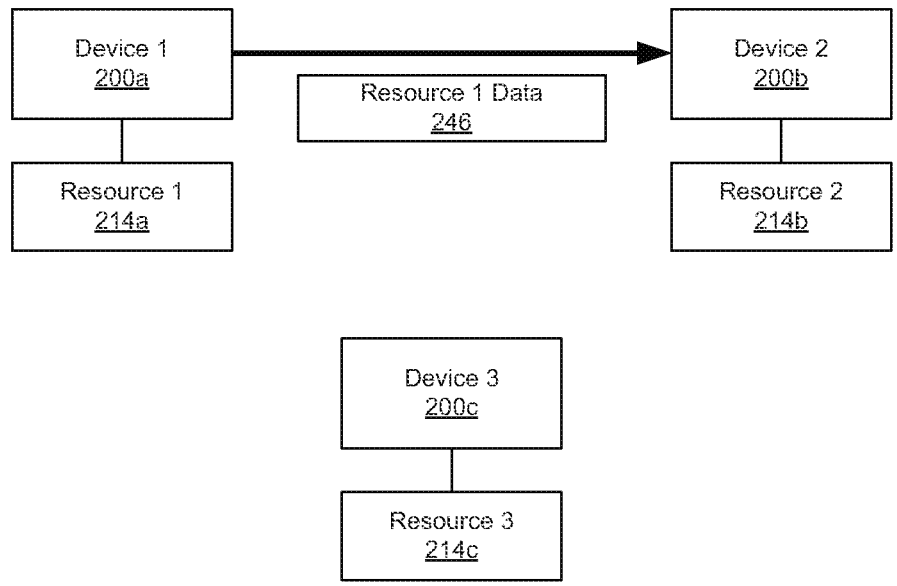

In FIG. 10, device 1 200a is shown as providing, to device 2 200b, updated data 246 representative of resource 1 214a. In some embodiments, device 1 200a may send updated data regarding a local resource (such as resource 1 214a) to one or more of its remote devices when the properties of the local resource change (e.g., the capacity of a storage device), after device 1 200a or one of its remote devices provides instructions to control the local resource, and/or after device 1 200l or one of its remote devices relinquishes control over the local resource. For example, in some embodiments, resource 1 214a may include a storage device including files related to a common project between device 1 200a, device 2 200b, and device 3 200c. When one or more of these project files is changed by device 3 200c, updated data representative of the files may be transmitted to device 2 200b when device 3 200c finishes changes the files, or on a periodic or asynchronous basis.

Figure 11:
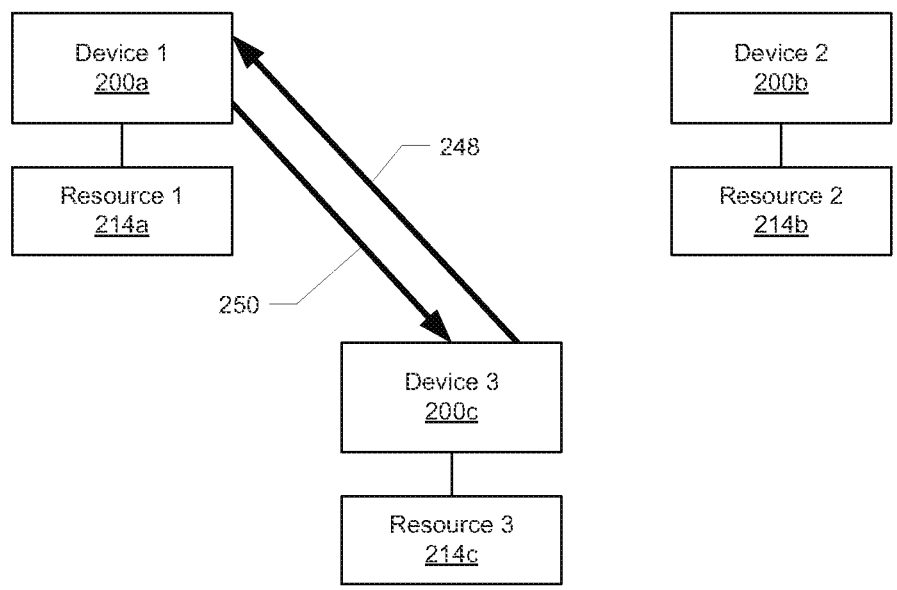

In FIG. 11, device 1 200a is shown as providing credential 250 to device 3 200c. Device 3 200c is shown as providing data 248, representative of resource 3 214c, to device 1 200a. Data 248 and credential 250 may be transmitted between device 3 200c to device 1 200a over a D2D communication channel. A sharing request may also be transmitted from device 3 200c (not shown), and some or all of these transmission may be part of a mutual credentialing process including device 1 200a providing credential 240 to device 3 200c (as shown in FIG. 8). Credential 250 (provided by device 1 200a to device 3 200c) may be different from credential 232 (provided by device 1 200a to device 2 200b), for example, when the credentialing protocols for resource sharing employed by device 2 200b and device 3 200c are different.

Figure 12:
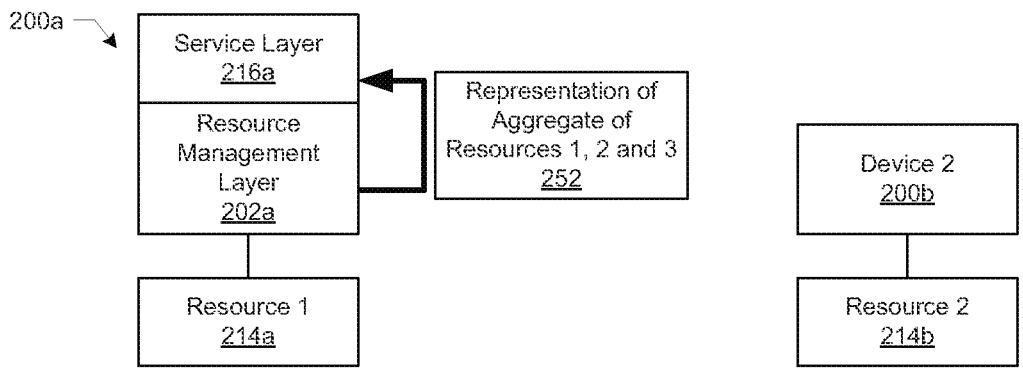
Figure 12:
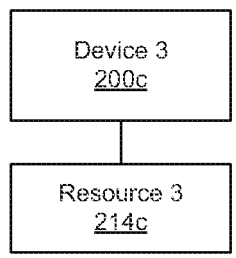

If resource 3 214c is of a same type as resource 1 214a and resource 2 214b, device 1 200a may represent these local resources as a single aggregate resource (e.g., as discussed above with reference to FIG. 6). Continuing with the storage device example discussed above, if resource 1 214a is a storage device with a capacity of 5 GB, resource 2 214b is a storage device with a capacity of 3 GB, and resource 3 214c is a storage device with capacity 6 GB, resource 1 214a, resource 2 214b, and resource 3 214c may be aggregated and represented as a single aggregate storage device with a capacity of 14 GB. FIG. 12 illustrates the representation of an aggregation. In particular, in FIG. 12, device 1 200a is expanded to show its component service layer 216a and resource management layer 202a. Resource management layer 202a is shown as providing, to service layer 216a of the device 1 200a, a representation 252 of an aggregation of resource 1 214a, resource 2 214b, and resource 3 214c as an aggregate local resource available for use by service layer 216a. Because of representation 252, resource 1 214a, resource 2 214b, and resource 3 214c may appear to service layer 216a as a single local storage device with a capacity of 14 GB. If resource 2 214b and resource 3 214c were of a same type, and resource 1 214a were of a different type, resource management layer 202a may provide, to service layer 216a, a representation of an aggregation of resource 2 214b and resource 3 214c as an aggregate local resource available for use by service layer 216a.

Figure 13:
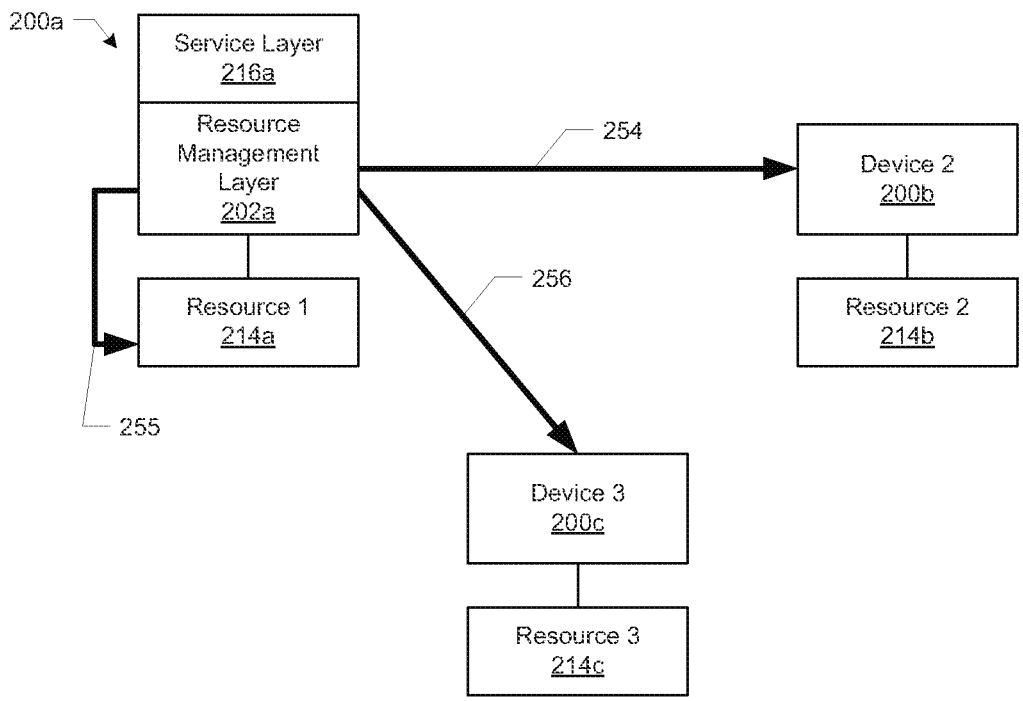

In FIG. 13, device 1 200a is shown as providing instruction 254 to device 2 200b to control the use of resource 2 214b, and instruction 256 to device 3 200c to control the use of resource 3 214c. Instructions 254 and 256 may be transmitted to device 2 200b and device 3 200c, respectively, over separate D2D communication channels. Device 1 200a is also shown as providing instruction 255 from service layer 216a to resource management layer 202a to control the use of resource 1 214a. In some embodiments, these multiple instructions may be triggered by a control instruction from service layer 216a targeted to an aggregate resource; resource management layer 202a may intercept this instruction and transmit multiple instructions to each of the devices local to the resources that made up the aggregate. As discussed above with reference to FIG. 7, the allocation of instructions between various devices local to components of an aggregate may depend on any of a number of factors stored in a resource aggregation module and/or a credential management module (such as resource aggregation module 108 and/or credential management module 106 of FIG. 1), including the bandwidth available on various D2D communication channels, the demand on the component resources, etc. From the perspective of the service and/or application layer of device 1 200a, control of resource 1 214a, resource 2 214b and resource 3 214c may appear to be direct control of a single local resource.

As illustrated in FIGS. 2-13, two or more devices configured for D2D resource sharing as described herein may communicate over pairwise D2D communication channels to pass credentials, data representative of resources, resource control instructions, and other data. In some embodiments, the devices may be arranged in a peer-to-peer network architecture. In some embodiments, the devices may be arranged in a hierarchical network architecture, wherein one or more "master" devices is voted on or predetermined to be in control of the allocation of resources to devices.

FIGS. 2-13 illustrate the establishment of D2D communication channels between pairs of devices. In some embodiments, devices that share resources may stop sharing and/or terminate one or more D2D communication channels in which they participate. A first device may stop sharing with a second device for any of a number of reasons. For example, in some embodiments, a first device may stop sharing with a second device when the geographic distance between the first and second devices exceeds a threshold (e.g., the threshold for adequate wireless NFC strength). In some embodiments, a first device may stop sharing with a second device when the second device leaves a predefined area (such as a business office) or is no longer connected to a trusted network. In some embodiments, a first device may stop sharing with a second device when the first device anticipates or experiences extended use of its local resources, and does not wish to waste overhead in maintaining any D2D communication channels for sharing. For example, a video camera device may no longer be able to share any data with a second device if the video camera device no longer has access to a high bandwidth connection; in some such embodiments, a resource management layer of the second device may delete the video camera device from the constellation of sharing devices and notify other devices in the constellation of the deletion of the video camera device. In some embodiments, only currently active devices in the constellation are notified substantially contemporaneously with the deletion of the video camera device, while sleeping devices or other inactive devices may be notified at a later time.

Figure 14:
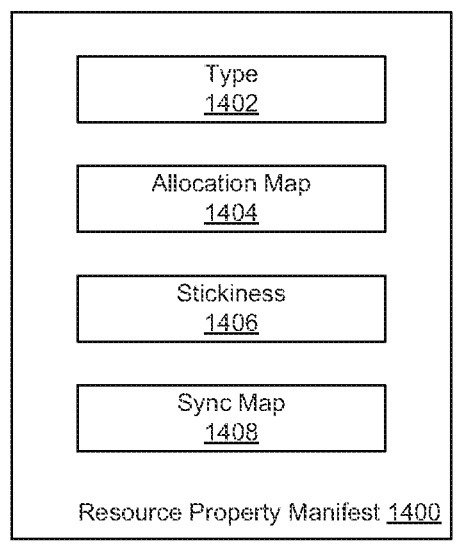
FIG. 14 illustrates an example resource attribute manifest for use in D2D resource sharing, in accordance with various embodiments.

Referring now to FIG. 14, an example resource property manifest 1400 is illustrated, in accordance with various embodiments. In some embodiments, resource property manifest 1400 may be a file, database entry or other data set that includes data representative of one or more resources. In some embodiments, resource property manifest 1400 may be stored in memory associated with local resource properties management module 112 (FIG. 1), and may include data representative of one or more of local resources 114. In some embodiments, resource property manifest 1400 may be stored in resource aggregation module 108 (FIG. 1), and may include data representative of one or more resources that are not local to device 100, but which may be available to device 100 through D2D resource sharing as described herein. In some embodiments, only the device or devices for which a resource is local may edit the resource property manifest associated with that resource; in some such embodiments, other devices receive read-only copies of the resource property manifest, or portions of or derivative data based on the resource property manifest, but may not change the manifest itself.

Resource property manifest 1400 may include a number of different kinds of data about the one or more resources associated with resource property manifest 1400. For ease of discussion of FIG. 14, the one or more resources associated with resource manifest 1400 may be referred to as "the resource." In some embodiments, resource property manifest 1400 may include type data 1402. Type data 1402 may be representative of a type of the resource; for example, whether the resource is a storage device, a global positioning system (GPS) device, a camera, an accelerometer, another sensor, etc. Type data 1402 may be used by resource management layer 102 in determining how to represent the resource to higher layers, such as service layer 116 and application layer 118. In some embodiments, type data 1402 may be used by resource aggregation module 108 (FIG. 1) to determine whether and how the resource may be aggregated with other resources.

In some embodiments, resource property manifest 1400 may include allocation map data 1404. Allocation map data 1402 may be representative of whether or not the resource is currently in use by any devices which are authorized to control the resource. Allocation map data 1402 may be representative of the number of devices authorized to control the resource, and/or how many such devices are currently controlling, or recently have controlled, the resource. Allocation map data 1402 may be representative of the relative priority and/or criticality of current uses of the resource. For example, in some embodiments, resource management module 102 (FIG. 1) may use criticality data included in allocation map data 1402 to transmit an alert to a device currently using the resource in a critical application (e.g., a time-sensitive measurement of a patient in a hospital) that an owner of the resource is about to terminate the sharing of the resource (and/or may transmit an alert to the owner of the resource).

In some embodiments, resource property manifest 1400 may include stickiness data 1406. As discussed above with reference to FIG. 1, as used herein, the "stickiness" of a property of a resource may indicate whether that particular property (e.g., a calibration factor of a medical device, or a baseline value for a sensor) is subject to change when a particular device (e.g., the device 100 or a remote device) ceases to control the resource. For example, in some embodiments, an audio recording resource may store a short recorded segment in a temporary buffer before transferring that segment to a more permanent storage location. If a first device uses the audio recording resource, the buffer may be emptied when a second device begins to use the audio recording resource. It may be important, therefore, for devices to know which properties of resources are "sticky" in the sense that they will be retained by the resource across multiple device "users" and which ones are not (so that proper precautions may be taken to save desired data or to recalibrate the device upon a new use, for example).

In some embodiments, resource property manifest 1400 may include sync map data 1408. In some embodiments, sync map data 1408 may be used to constrain two or more resources in a constellation to adhere to the same internal state or properties. For example, a second display resource on a remote device might be set in "mirror mode" by an application on the remote device having access to both local and remote displays as distinct resources. By storing an indication of the "mirror mode" among sync map data 1408, the matching of displays may be enforced so that two constellation users may see the same content on their individual displays. In some embodiments, sync map data 1408 for a particular resource may indicate that such "mirror modes" or other synchronization should be supported by any user of the resource. In another example, one device may act on a mirrored display resource with a local input resource (e.g., a touch screen), and the touch action may be sent as raw input to the remote device, displayed on the remote device's display resource, then mirrored back to the local display device. In another example, an area of RAM may be aggregated across two devices as a display "frame buffer," with each device displaying a complementary portion of the frame buffer on the device's local display. In such an embodiment, sync map data 1408 may indicate that the content of the frame buffer should be kept in sync between the two devices.

In some embodiments, the systems and techniques disclosed herein may be advantageously used in mobile device systems to allows users of the resources (e.g., applications running on the mobile devices) to take advantage of the dynamic availability of resources due to the migration of devices and resources in and out of the constellation. These dynamically available resources may be exposed by a resource manager (such as resource management layer 102 of FIG. 1) directly to applications (e.g., in application layer 118 of FIG. 1). Systems in accordance with such embodiments may enable a computing environment in which, for example, applications may register a callback when a resource becomes available or when other resource-related conditions occur (e.g., when the communication bandwidth of the device drops below a threshold for acceptable use of a remote resource). In one example embodiment, device 100 may be a mobile computing device (e.g., a phone, tablet, or laptop) and applications running in application layer 118 of device 100 may be in communication with local resources 114. As device 100 moves from one environment to another, new resources may become available for control by device 100 via a D2D communication channel (e.g., when device 100 enters a user's home, remote resources such a local thermostat, an electronic light control system, and a musical instrument may all become available). When the access control setting are appropriate, applications running on device 100 may control the remote resources as if they were local. For example, a music playback application (running in application layer 118) may provide a feature that allows the songs that are played to be downloaded to the remote musical instrument, as well as adjust the temperature and lighting to suit the mood of the song that is being played back.

Figure 15:
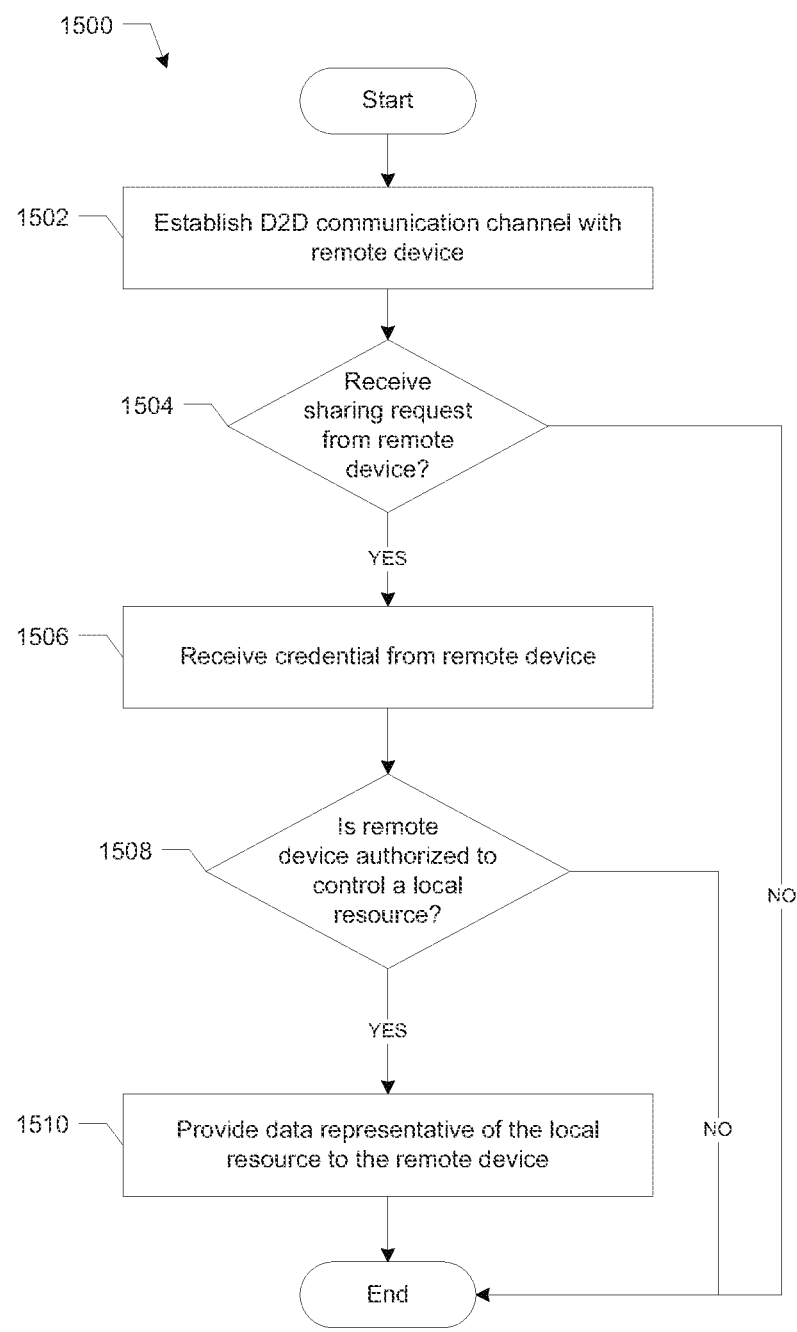
FIG. 15 is a flow diagram of an example process for enabling control of a resource local to an owner device by a remote device, in accordance with various embodiments.

Referring now to FIG. 15, a flow diagram is provided of an example process 1500 for enabling control of a resource local to an owner device by a remote device, in accordance with various embodiments. It may be recognized that, while the operations of process 1500 (and the other processes described herein) are arranged in a particular order and illustrated once each, in various embodiments, one or more of the operations may be repeated, omitted or performed out of order. For illustrative purposes, operations of process 1500 may be described as performed by various components of device 100 (FIG. 1), but process 1500, and individual operations of process 1500, may be performed by any suitably configured component or combination of components of device 100.

Process 1500 may begin at operation 1502 in which device 100 may establish a D2D communication channel with a remote device. In some embodiments, operation 1502 may be performed by D2D communication module 102 (FIG. 1). In some embodiments, the D2D communication channel may be a temporary channel, and may be unsecured or may have a low level of security.

At operation 1504, device 100 may determine whether a sharing request has been received from the remote device with which a D2D communication channel was established at operation 1502. In some embodiments, operation 1504 may be performed by D2D communication module 102 (FIG. 1). In some embodiments, operation 1504 may include some or all of the operations described above with reference to FIGS. 2 and 8. If no sharing request is received at operation 1504, the process may end.

If a sharing request is received at operation 1504, device 100 may proceed to operation 1506 and may receive a credential from the remote device. In some embodiments, the credential received at operation 1506 may be included with the sharing request identified at operation 1504. In some embodiments, operation 1506 may be performed by D2D communication module 102 and/or credential management module 106 (FIG. 1). In some embodiments, the credential received at operation 1506 may identify the remote device. In some embodiments, operation 1506 may include some or all of the operations described above with reference to FIGS. 3, 5, 8 and 10.

At operation 1508, device 100 may determine whether the remote device is authorized to control a resource locally available to device 100 (e.g., one or more of local resources 114, referred to as "the local resource"). In some embodiments, operation 1508 may be performed by D2D communication module 102 and credential management module 106 (FIG. 1). In some embodiments, the determination of operation 1508 may be based on the credential received from the remote device at operation 1506. In some embodiments, operation 1506 may be omitted and the determination of operation 1508 may be based on other criteria (for example, whether the local resources are currently busy or whether device 100 has sufficient power or bandwidth to engage in resource sharing).

If device 100 determines at operation 1508 that the remote device is not authorized to control the local resource, process 1500 may end. If device 100 determines at operation 1508 that the remote device is authorized to control a local resource, device 100 may proceed to operation 1510 and may provide data representative of the local resource to the remote device. In some embodiments, operation 1510 may be performed by D2D communication module 102, local resource control module 110 resource aggregation module 108 (FIG. 1). In some embodiments, the data representative of the local resource may include data representative of current or past usage of the local resource. In some embodiments, the data representative of the local resource comprises an indicator of a property of the local resource that is subject to change after the local resource is no longer controlled in accordance with instructions from the second device (see, e.g., the discussion of "stickiness" above). In some embodiments, the data representative of the local resource may include some or all of the data included in an ACL or a resource property manifest such as resource property manifest 1400 of FIG. 14. In some embodiments, operation 1510 may include some or all of the operations described above with reference to FIGS. 3, 5, 8 and 10. Process 1500 may then end.

Figure 16:
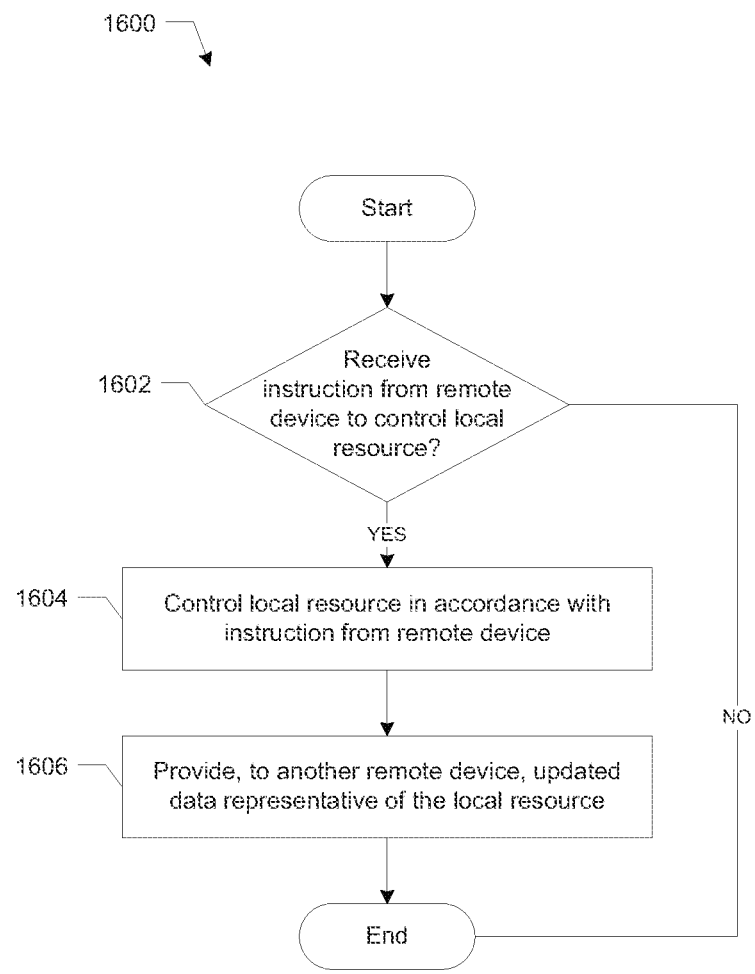
FIG. 16 is a flow diagram of an example process for controlling a resource local to an owner device based on instructions from a remote device, in accordance with various embodiments.

Referring now to FIG. 16, a flow diagram is provided of an example process 1600 for controlling a resource local to an owner device based on instructions from a remote device, in accordance with various embodiments. For illustrative purposes, operations of process 1600 may be described as performed by various components of device 100 (FIG. 1), but process 1600, and individual operations of process 1600, may be performed by any suitably configured component or combination of components of device 100. In some embodiments, process 1600 may follow process 1500 (FIG. 15) to allow a remote device to control the local resource after enabling such control according to process 1500.

Process 1600 may begin at operation 1602 in which device 100 may determine whether an instruction to control a resource locally available to device 100 (e.g., one or more of local resources 114, referred to as "the local resource") has been received from a remote device. In some embodiments, operation 1602 may be performed by D2D communication module 102 (FIG. 1). If device 100 determines at operation 1602 that no instruction has been received, process 1600 may end. If device 100 determines at operation 1602 that an instruction has been received, device 100 may proceed to operation 1604 and control the local resource in accordance with the instruction. In some embodiments, operation 1602 may be performed by local resource control module 110 (FIG. 1). In some embodiments, operation 1604 may include some or all of the operations described above with reference to FIGS. 4, 7, 9 and 13.

At operation 1606, device 100 may provide, to another remote device, updated data representative of the local resource. In some embodiments, operation 1606 may be performed by D2D communication module 102, local resource properties management module 112 and resource aggregation module 108 (FIG. 1). This updated data may include updated data representative of properties of the local resource. For example, in some embodiments in which the local resource is a printer, device 100 may provide updated information to a remote device about the level of toner remaining after another remote device has completed a print job. In some embodiments, operation 1606 may use sync map data 1408 to determine how updates are handled for different resources. In some embodiments, operation 1606 may include some or all of the operations described above with reference to FIGS. 3, 5, 8 and 10. Process 1600 may then end.

Figure 17:
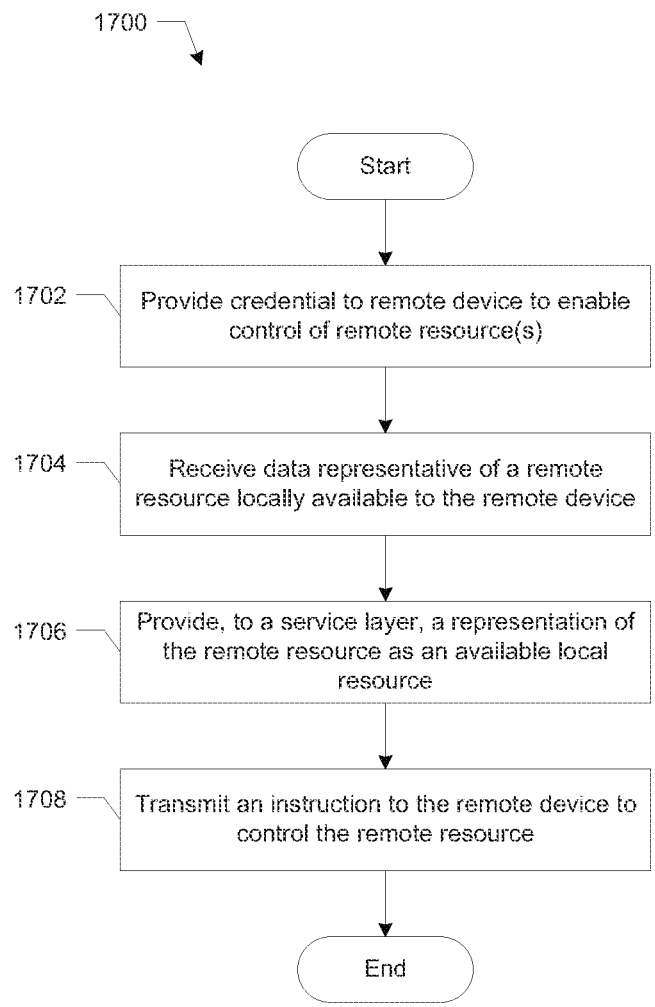
FIG. 17 is a flow diagram of an example process for controlling a remote resource, in accordance with various embodiments.

Referring now to FIG. 17, a flow diagram is provided of an example process 1700 for controlling a remote resource, in accordance with various embodiments. For illustrative purposes, operations of process 1600 may be described as performed by various components of device 100 (FIG. 1), but process 1700, and individual operations of process 1700, may be performed by any suitably configured component or combination of components of device 100. In some embodiments, process 1700 may be executed by device 1 200*a* (FIG. 2) when controlling resource 2 214*b* of device 2 200*b* as illustrated in FIGS. 5-7.

Process 1700 may begin at operation 1702 in which device 100 may provide a credential to a remote device to enable control of resource(s) locally available to the remove device (referred to as "remote resource(s)"). In some embodiments, operation 1702 may be performed by D2D communication module 102 and credential management module 106 (FIG. 1). In some embodiments, operation 1702 may include some or all of the operations described above with reference to FIGS. 3, 5, 8 and 10.

At operation 1704, device 100 may receive data representative of the remote resources. In some embodiments, operation 1704 may be performed by D2D communication module 102 and resource aggregation module 108 (FIG. 1). In some embodiments, operation 1704 may include some or all of the operations described above with reference to FIGS. 3, 5, 8 and 10.

At operation 1706, device 100 may provide, to service layer 116, a representation of the remote resource as an available local resource. In some embodiments, operation 1706 may be performed by resource aggregation module 108 (FIG. 1). In some embodiments, operation 1706 may include some or all of the operations described above with reference to FIGS. 6 and 12. In some embodiments, the remote resource may be aggregated with additional resources local or remote to device 100 in the representation to service layer 116 (e.g., as illustrated in FIGS. 6 and 12). In some embodiments, the remote resource may not be aggregated with additional resource(s) in the representation to service layer 116.

At operation 1708, device 100 may transmit an instruction to the remote device to control the remote resource. In some embodiments, operation 1708 may be performed by D2D communication module 102 (FIG. 1). In some embodiments, operation 1708 may include some or all of the operations described above with reference to FIGS. 4, 7, 9 and 13. Process 1700 may then end.

Figure 18:
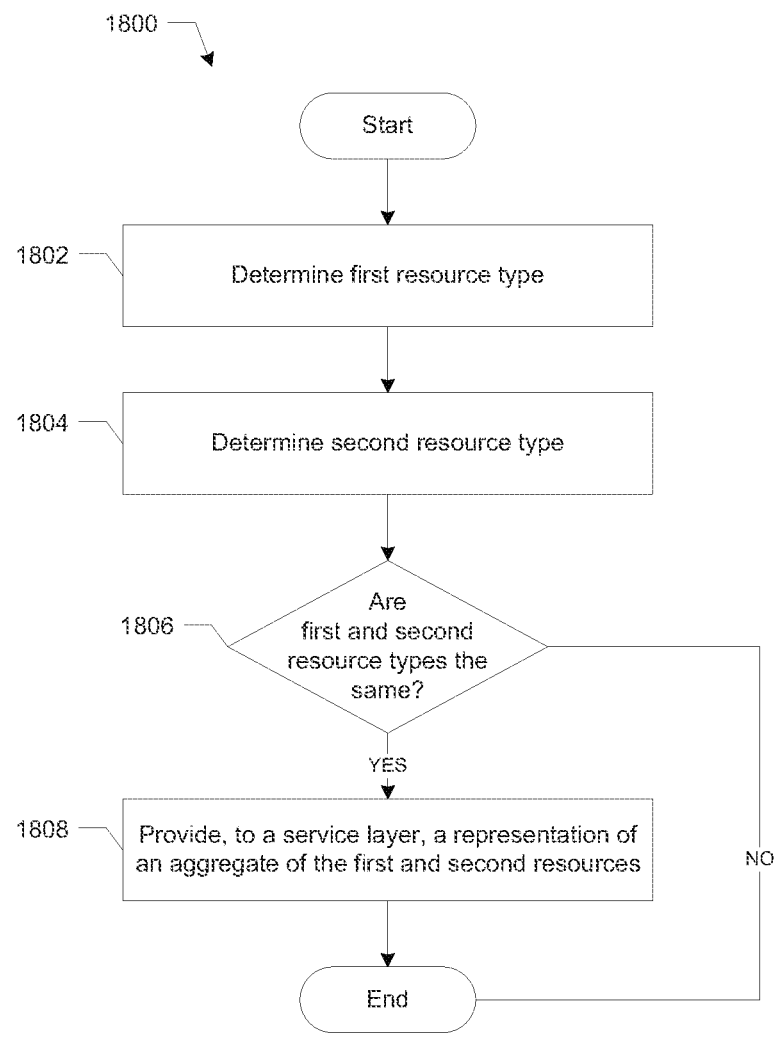
FIG. 18 is a flow diagram of an example process for aggregating resources for representation to a service layer of a device, in accordance with various embodiments.

Referring now to FIG. 18, a flow diagram is provided of an example process 1800 for aggregating resources for representation to a service layer of a device, in accordance with various embodiments. For illustrative purposes, operations of process 1800 may be described as performed by resource aggregation module 108 of device 100 (FIG. 1), but process 1800, and individual operations of process 1800, may be performed by any suitably configured component or combination of components of device 100.

Process 1800 may begin at operation 1802 in which resource aggregation module 108 may determine a type associated with a first resource that is a candidate for aggregation. The first resource may be local to device 100 (e.g., one or more of local resources 114) or remote to device 100. In some embodiments, determining a type of the first resource at operation 1802 may include identifying type data contained in a resource property manifest (e.g., resource property manifest 1400 of FIG. 14) associated with the first resource. In some embodiments, determining a type of the first resource at operation 1802 may include analyzing other data, such as a model name or serial number associated with the first resource. In some embodiments, a remote resource may appear as an additional "local" resource to the resource aggregator, with a virtualization proxy implemented at a lower layer for systems with virtualization mechanisms available.

At operation 1804, resource aggregation module 108 may determine a type associated with a second resource that is a candidate for aggregation. The second resource may be local to device 100 (e.g., one or more of local resources 114) or remote to device 100. Determining a type at operation 1804 may take any of the forms described above with reference to determining a type at operation 1802. In some embodiments, different kinds of data may be used at operations 1802 and 1804 to identify the types of the first and second resources; for example, the type of the first resource may be identified by type data included in a resource property manifest, while the type of the second resource may be identified by a model name or serial number.

At operation 1806, resource aggregation module 108 may determine whether the type of the first resource and the type of the second resource are a same type. If no, process 1800 may then end. If yes, resource aggregation module 108 may proceed to operation 1808 and provide, to service layer 116 of device 100, a representation of an aggregate of the first and second resources. In some embodiments, operation 1808 may include some or all of the operations described above with reference to FIGS. 6 and 12. Process 1800 may then end.

Figure 19:
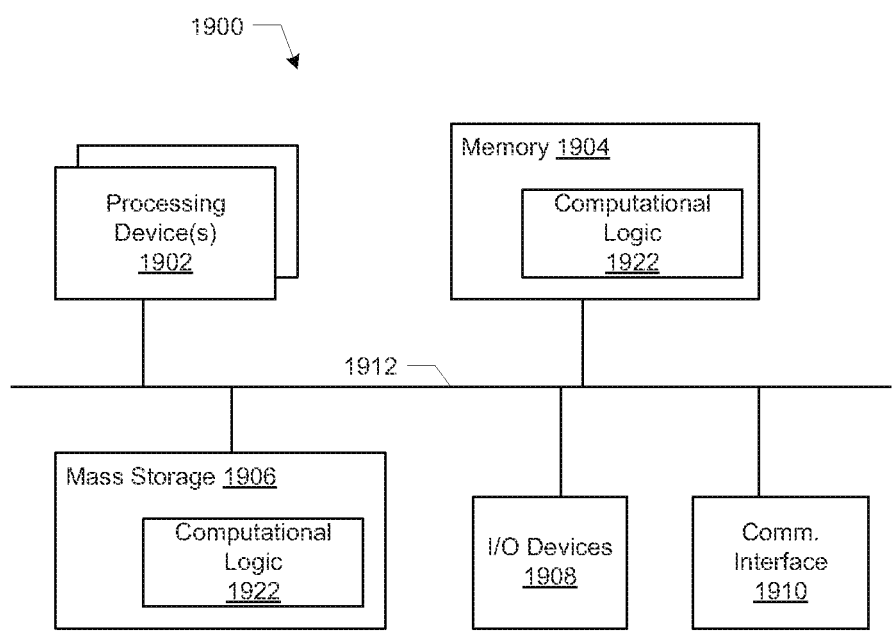
FIG. 19 is a block diagram of an example computing device suitable for practicing the disclosed embodiments, in accordance with various embodiments.

Referring now to FIG. 19, a block diagram is provided of an example computing device suitable for practicing the disclosed embodiments, in accordance with various embodiments. As shown, computing device 1900 includes a number of processing device(s) 1902, and system memory 1904. Examples of devices that may be included in processing device(s) 1902 include central processing units (CPUs), microprocessors, graphics processing units, and digital signal processing units. Additionally, computing system 1900 may include mass storage devices 1906 (such as diskette, hard drive, compact disc read only memory (CDROM) and so forth), input/output devices 1908 (such as display, keyboard, cursor control and so forth) and communication interfaces 1910 (such as network interface cards, modems and so forth). The elements may be coupled to each other via system bus 1912, which represents one or more buses. In the case of multiple buses, they may be bridged by one or more bus bridges (not shown).

Each of these elements may perform its conventional functions known in the art. In particular, system memory 1904 and mass storage 1906 may be employed to store a working copy and a permanent copy of the programming instructions implementing the method of any of FIGS. 15-18, or portions thereof, herein collectively denoted as computational logic 1922. The various components may be implemented by assembler instructions supported by processing device(s) 1902 or high-level languages, such as, for example, C, that can be compiled into such instructions. Machine readable media included in computing device 1900 or readable by computing device 1900 may include suitable volatile or non-volatile memory (e.g., flash memory) and/or may include any suitable non-volatile storage device(s), such as one or more hard disk drive(s) (HDD(s)), one or more solid-state drive(s), one or more compact discs (CDs), and/or one or more digital versatile discs (DVDs), for example.

The permanent copy of the programming instructions may be placed into permanent storage 1906 in the factory, or in the field, through, for example, a machine-accessible distribution medium (not shown), such as a compact disc (CD), or through communication interface 1910 (e.g., from a distribution server (not shown)). That is, one or more distribution media having an implementation of the instructions may be employed to distribute the instructions and program various computing devices. The constitution of elements 1902-1912 are known, and accordingly will not be further described. Any one or more suitable hardware, firmware, or software components of computing device 1900, or any combination thereof, may serve as a resource for sharing in a D2D resource sharing system in accordance with the techniques disclosed herein.

Machine-readable media (including non-transitory machine readable media, such as), methods, systems and devices for performing the above-described techniques are illustrative examples of embodiments disclosed herein. Additionally, other devices in the above-described interactions may be configured to perform various disclosed techniques.

EXAMPLES

Example 1 is a method for sharing resources between devices, including: establishing a device-to-device communication channel between a first device and a second device; receiving, from the second device, a sharing request including a credential identifying the second device; providing, to the second device from the first device, data representative of a first resource locally available to the first device, the first resource not locally available to the second device; and controlling use of the first resource in accordance with an instruction transmitted to the first device from the second device.

Example 2 may include the subject matter of Example 1, and further specifies that the sharing request is triggered by a near-field communication tap between the first device and the second device, an infrared-based ping query between the first device and the second device, or a location change of the second device.

Example 3 may include the subject matter of any of Examples 1-2, and further includes, prior to controlling use of the first resource in accordance with the instruction transmitted to the first device from the second device, determining, at the first device, that the second device is authorized to control the first resource based on the credential received from the second device.

Example 4 may include the subject matter of any of Examples 1-3, and further specifies that the data representative of the first resource includes data representative of current or past usage of the first resource.

Example 5 may include the subject matter of any of Examples 1-4, and further specifies that the data representative of the first resource includes an indicator of a property of the first resource that is subject to change after the first resource is no longer controlled in accordance with an instruction from the second device.

Example 6 may include the subject matter of any of Examples 1-5, and further includes: establishing a second device-to-device communication channel between the first device and a third device, the third device different from the second device; receiving, from the third device, a sharing request including a credential identifying the third device; providing, to the third device from the first device, data representative of the first resource, the first resource not locally available to the third device; and controlling use of the first resource in accordance with an instruction transmitted to the first device from the third device.

Example 7 may include the subject matter of Example 6, and further includes sending, to the second device, updated data representative of the first resource after controlling use of the first resource in accordance with the instructions transmitted to the first device from the third device.

Example 8 may include the subject matter of any of Examples 1-7, and further includes: providing, to the second device, a credential identifying the first device; receiving, at the first device from the second device, data representative of a second resource locally available to the second device, the second resource not locally available to the first device; and providing, to the service layer of the first device, a representation of the second resource as a local resource available for use by the service layer.

Example 9 may include the subject matter of Example 8, and further specifies that providing, to a service layer of the first device, a representation of the second resource as a local resource available for use by the service layer includes: identifying a type of the second resource based on the data representative of the second resource; identifying a third resource locally available to the first device, the third resource having a same type as the type of the second resource; and providing, to a service layer of the first device, a representation of an aggregate of the second and third resources.

Example 10 may include the subject matter of Example 8, and further includes: establishing a second device-to-device communication channel between the first device and a third device, the third device different from the second device; providing, to the third device over the second device-to-device communication channel, a credential identifying the first device; receiving, at the first device from the third device, data representative of a third resource locally available to the third device, the third resource not locally available to the first device; and providing, to a service layer of the first device, a representation of the third resource as a local resource available for use by the service layer.

Example 11 may include the subject matter of Example 10, and further specifies that providing, to a service layer of the first device, a representation of the third resource as a local resource available for use by the service layer includes: identifying a type of the second resource based on the data representative of the second resource; identifying a type of the third resource based on the data representative of the third resource; and providing, to a service layer of the first device, a representation of an aggregate of the second and third resources.

Example 12 may include the subject matter of any of Examples 1-11, and further specifies that the first device includes a personal computing device and the second device includes a personal computing device, a camera, or a musical instrument.

Example 13 is one or more machine readable media including instructions that, in response to execution by a processing device of a first device, cause the first device to perform the method of any of Examples 1-12.

Example 14 is one or more machine readable media including instructions that, in response to execution by a processing device of a first device, cause the first device to: establish a device-to-device communication channel between the first device and a second device; receive, from the second device, a sharing request including a credential identifying the second device; provide, to the second device, data representative of a first resource locally available to the first device, the first resource not locally available to the second device; and control use of the first resource in accordance with an instruction transmitted to the first device from the second device.

Example 15 may include the subject matter of Example 14, and further specifies that the sharing request is triggered by a near-field communication tap between the first device and the second device, an infrared-based ping query between the first device and the second device, or a location change of the second device.

Example 16 may include the subject matter of any of Examples 14-15, and further includes instructions that, in response to execution by the processing device, cause the first device to: prior to controlling use of the first resource in accordance with the instruction transmitted to the first device from the second device, determine that the second device is authorized to control the first resource based on the credential received from the second device.

Example 17 may include the subject matter of any of Examples 14-16, and further specifies that the data representative of the first resource includes data representative of current or past usage of the first resource.

Example 18 may include the subject matter of any of Examples 14-17, and further specifies that the data representative of the first resource includes an indicator of a property of the first resource that is subject to change after the first resource is no longer controlled in accordance with an instruction from the second device.

Example 19 may include the subject matter of any of Examples 14-18, and further includes instructions that, in response to execution by the processing device, cause the first device to: establish a second device-to-device communication channel between the first device and a third device, the third device different from the second device; receive, from the third device, a sharing request including a credential identifying the third device; provide, to the third device, data representative of the first resource, the first resource not locally available to the third device; and control use of the first resource in accordance with an instruction transmitted to the first device from the third device.

Example 20 may include the subject matter of Example 19, and further includes instructions that, in response to execution by the processing device, cause the first device to: send, to the second device, updated data representative of the first resource after controlling use of the first resource in accordance with the instructions transmitted to the first device from the third device.

Example 21 may include the subject matter of any of Examples 14-20, and further includes instructions that, in response to execution by the processing device, cause the first device to: provide, to the second device, a credential identifying the first device; receive, from the second device, data representative of a second resource locally available to the second device, the second resource not locally available to the first device; and provide, to a service layer of the first device, a representation of the second resource as a local resource available for use by the service layer.

Example 22 may include the subject matter of Example 21, and further specifies that provide, to a service layer of the first device, a representation of the second resource as a local resource available for use by the service layer includes: identify a type of the second resource based on the data representative of the second resource; identify a third resource locally available to the first device, the third resource having a same type as the type of the second resource; and provide, to the service layer of the first device, a representation of an aggregate of the second and third resources.

Example 23 may include the subject matter of Example 21, and further includes instructions that, in response to execution by the processing device, cause the first device to: establish a second device-to-device communication channel between the first device and a third device, the third device different from the second device; provide, to the third device over the second device-to-device communication channel, a credential identifying the first device; receive, from the third device, data representative of a third resource locally available to the third device, the third resource not locally available to the first device; and provide, to a service layer of the first device, a representation of the third resource as a local resource available for use by the service layer.

Example 24 may include the subject matter of Example 23, and further specifies that provide, to a service layer of the first device, a representation of the third resource as a local resource available for use by the service layer includes: identify a type of the second resource based on the data representative of the second resource; identify a type of the third resource based on the data representative of the third resource; and provide, to the service layer of the first device, a representation of an aggregate of the second and third resources.

Example 25 may include the subject matter of any of Examples 14-24, and further specifies that the first device includes a personal computing device and the second device includes a personal computing device, a camera, or a musical instrument.

Example 26 is an apparatus for sharing resources, including: means for establishing a device-to-device communication channel between the apparatus and a second device; means for receiving, from the second device, a sharing request including a credential identifying the second device; means for providing, to the second device, data representative of a first resource locally available to the first device, the first resource not locally available to the second device; and means for controlling use of the first resource in accordance with an instruction transmitted to the apparatus from the second device.

Example 27 may include the subject matter of Example 26, and further includes: means for providing, to the second device, a credential identifying the apparatus; means for receiving, from the second device, data representative of a second resource locally available to the second device, the second resource not locally available to the apparatus; and means for providing, to a service layer of the apparatus, a representation of the second resource as a local resource available for use by the service layer.

Example 28 may include the subject matter of any of Examples 26-27, and further specifies that the means for providing, to a service layer of the apparatus, a representation of the second resource as a local resource available for use by the service layer includes: means for identifying a type of the second resource based on the data representative of the second resource; means for identifying a third resource locally available to the apparatus, the third resource having a same type as the type of the second resource; and means for providing, to the service layer of the apparatus, a representation of an aggregate of the second and third resources.

Example 29 may include the subject matter of any of Examples 26-28, and further includes: means for establishing a second device-to-device communication channel between the apparatus and a third device, the third device different from the second device; means for providing, to the third device over the second device-to-device communication channel, a credential identifying the apparatus; means for receiving, from the third device, data representative of a third resource locally available to the third device, the third resource not locally available to the apparatus; and means for providing, to a service layer of the apparatus, a representation of the third resource as a local resource available for use by the service layer.

Example 30 is an apparatus for sharing resources between devices, including one or more processing devices, and one or more machine readable media configured with instructions that, in response to execution by the one or more processing devices, cause the apparatus to: establish a device-to-device communication channel between the apparatus and a second device; receive, from the second device, a sharing request including a credential identifying the second device; provide, to the second device, data representative of a first resource locally available to the apparatus, the first resource not locally available to the second device; and control use of the first resource in accordance with an instruction transmitted to the apparatus from the second device.

Example 31 may include the subject matter of Example 30, and further specifies that the sharing request is triggered by a near-field communication tap between the apparatus and the second device, an infrared-based ping query between the apparatus and the second device, or a location change of the second device.

Example 32 may include the subject matter of any of Examples 30-31, and further specifies that the one or more machine readable further include instructions that, in response to execution by the one or more processing devices, cause the apparatus to: prior to controlling use of the first resource in accordance with the instruction transmitted to the apparatus from the second device, determine that the second device is authorized to control the first resource based on the credential received from the second device.

Example 33 may include the subject matter of any of Examples 30-32, and further specifies that the data representative of the first resource includes data representative of current or past usage of the first resource.

Example 34 may include the subject matter of any of Examples 30-33, and further specifies that the data representative of the first resource includes an indicator of a property of the first resource that is subject to change after the first resource is no longer controlled in accordance with an instruction from the second device.

Example 35 may include the subject matter of any of Examples 30-34, and further specifies that the one or more machine readable media further includes instructions that, in response to execution by the one or more processing devices, cause the apparatus to: establish a second device-to-device communication channel between the apparatus and a third device, the third device different from the second device; receive, from the third device, a sharing request including a credential identifying the third device; provide, to the third device, data representative of the first resource, the first resource not locally available to the third device; and control use of the first resource in accordance with an instruction transmitted to the apparatus from the third device.

Example 36 may include the subject matter of Example 35, and further specifies that the one or more machine readable media further includes instructions that, in response to execution by the one or more processing devices, cause the apparatus to: send, to the second device, updated data representative of the first resource after controlling use of the first resource in accordance with the instructions transmitted to the apparatus from the third device.

Example 37 may include the subject matter of any of Examples 30-36, and further specifies that the one or more machine readable media further includes instructions that, in response to execution by the one or more processing devices, cause the apparatus to: provide, to the second device, a credential identifying the apparatus; receive, from the second device, data representative of a second resource locally available to the second device, the second resource not locally available to the apparatus; and provide, to a service layer of the apparatus, a representation of the second resource as a local resource available for use by the service layer.

Example 38 may include the subject matter of Example 37, and further specifies that provide, to a service layer of the apparatus, a representation of the second resource as a local resource available for use by the service layer includes: identify a type of the second resource based on the data representative of the second resource; identify a third resource locally available to the apparatus, the third resource having a same type as the type of the second resource; and provide, to the service layer of the apparatus, a representation of an aggregate of the second and third resources.

Example 39 may include the subject matter of Example 37, and further specifies that the one or more machine readable media further includes instructions that, in response to execution by the one or more processing devices, cause the apparatus to: establish a second device-to-device communication channel between the apparatus and a third device, the third device different from the second device; provide, to the third device over the second device-to-device communication channel, a credential identifying the apparatus; receive, from the third device, data representative of a third resource locally available to the third device, the third resource not locally available to the apparatus; and provide, to a service layer of the apparatus, a representation of the third resource as a local resource available for use by the service layer.

Example 40 may include the subject matter of Example 39, and further specifies that provide, to a service layer of the apparatus, a representation of the third resource as a local resource available for use by the service layer includes: identify a type of the second resource based on the data representative of the second resource; identify a type of the third resource based on the data representative of the third resource; and provide, to the service layer of the apparatus, a representation of an aggregate of the second and third resources.

Example 41 may include the subject matter of any of Examples 30-40, and further specifies that the apparatus includes a personal computing device and the second device includes a personal computing device, a camera, or a musical instrument.

Example 42 is an apparatus for sharing resources including means for performing the method of any of Examples 1-12.

What is claimed is:

1. At least one non-transitory computer-readable storage medium comprising a plurality of instructions configured to cause a first device, in response to execution of the instructions by the first device, to:
   process a request received from a second device, the request including a device identifier to identify the second device, the request also requesting an indication of availability of a plurality of resources located local to the first device and not locally available to the second device;
   send to the second device, the indication of availability of the plurality of resources of the first device, the plurality of resources comprising a sensor that produces data that changes with physical movement of the first device;
   process a selection from the second device, the selection indicating a selected resource of the plurality of resources; and
   send control instructions to the second device, the control instructions including data derived from the selected resource.

2. The non-transitory computer-readable storage medium of claim 1, wherein the instructions are configured to cause the first device to establish a sharing connection with the second device, the sharing connection being different from a network communication connection between the first device and the second device.

3. The non-transitory computer-readable storage medium of claim 2, wherein:
   the sharing connection is a device-to-device communication channel;
   the sharing connection is established with the second device prior to execution of the instructions by the first device, to process the request received from the second device; and
   the network communication connection is a transport connection.

4. The non-transitory computer-readable storage medium of claim 3, wherein the device-to-device communication channel comprises at least one of a secure socket layer protocol, a transport layer security protocol, or an encrypted channel using X.509 certificates to authenticate.

5. The non-transitory computer-readable storage medium of claim 1, wherein the instructions are configured to cause the first device to provide sharing information with more than one additional device at a time.

6. The non-transitory computer-readable storage medium of claim 1, wherein the first device is a mobile device, and the second device is a display device.

7. The non-transitory computer-readable storage medium of claim 1, wherein the plurality of resources comprises at least one of an accelerometer, a sensor interface, a processor core, a headset in communication via a Bluetooth protocol, or an electronic effects pedal in wired communication with an electric guitar device.

8. The non-transitory computer-readable storage medium of claim 1, wherein the instructions are configured to cause the first device to process information received about an identity of the plurality of resources to be controlled by the second device, the information received about the identity of the plurality of resources comprising at least one of model number, serial number, or unique resource name.

9. The non-transitory computer-readable storage medium of claim 1, wherein the instructions are configured to cause the first device to:
   establish a device-to-device communication channel with a third device, the third device different from the second device;
   receive, from the third device, a request including a device identifier to identify the third device;
   provide, to the third device from the first device, data representative of the plurality of resources;
   process a selection from the third device, the selection indicating a selected resource of the plurality of resources; and
   send control instructions to the third device, the control instructions including data derived from the selected resource.

10. The non-transitory computer-readable storage medium of claim 1, wherein the device identifier comprises at least one of model number, serial number, or unique device name.

11. A first device configured to have a primary use as a mobile phone, the first device comprising:
   a processor to:
   process a request received from a second device configured to have a primary use as a display device unassociated with the first device, the request including a device identifier to identify the second device, the request also requesting an indication of availability of a plurality of resources located local to the first device and not locally available to the second device;
   send to the second device, an indication of availability of the plurality of resources located local to the first device, the plurality of resources located local to the first device comprising a sensor that produces data that changes with physical movement of the first device;

process a selection from the second device, the selection indicating a selected resource of the plurality of resources located local to the first device; and send control instructions to the second device, the control instructions including data derived from the selected resource.

12. The first device of claim 11, wherein the processor is configured to cause the first device to establish a sharing connection with the second device, the sharing connection being different from a network communication connection between the first device and the second device.

13. The first device of claim 12, wherein:
the sharing connection is a device-to-device communication channel;
the sharing connection is established with the second device prior to processing the request received from the second device; and
the network communication connection is a transport connection.

14. The first device of claim 13, wherein the device-to-device communication channel comprises at least one of a secure socket layer protocol, a transport layer security protocol, or an encrypted channel using X.509 certificates to authenticate.

15. The first device of claim 11, wherein the processor is configured to cause the first device to provide sharing information with more than one additional device at a time.

16. The first device of claim 11, wherein the processor is configured to cause the first device to process feedback data from a second device for the selected resource of the plurality of resources.

17. The first device of claim 11, wherein the plurality of resources located local to the first device comprises at least one of an accelerometer, a sensor interface, a processor core, a headset in communication via a Bluetooth protocol, or an electronic effects pedal in wired communication with an electric guitar device.

18. The first device of claim 11, wherein the processor is configured to cause the first device to process information received about an identity of the selected resource to be controlled by the second device, the information received about the identity of the selected resource comprising at least one of model number, serial number, or unique resource name.

19. The first device of claim 11, wherein the processor is configured to cause the first device to:
establish a device-to-device communication channel with a third device, the third device different from the second device;
receive, from the third device, a request including a device identifier to identify the third device;
provide, to the third device from the first device, data representative of the plurality of resources, the plurality of resources not locally available to the third device;
indicate a third device selected resource of the plurality of resources; and
send control instructions to the third device, the control instructions including data derived from the third device selected resource.

20. The first device of claim 11, wherein the device identifier comprises at least one of model number, serial number, or unique device name.

21. A method for using a first device to control a second device, the method comprising:
processing a request received from the second device including a device identifier to identify the second device, the request also requesting an indication of availability of a plurality of resources located local to the first device and not locally available to the second device;
sending to the second device, an indication of availability of the plurality of resources of the first device, the plurality of resources comprising a sensor that produces data that changes with physical movement of the first device;
processing a selection from the second device, the selection indicating a selected resource from the plurality of resources; and
sending control instructions to the second device, the control instructions including data derived from the selected resource.

22. The method of claim 21, comprising establishing a sharing connection between the first device and the second device, the sharing connection being different from a network communication connection between the first device and the second device.

23. The method of claim 22, wherein:
the sharing connection is a device-to-device communication channel;
the sharing connection is established with the second device prior to processing the request received from the second device; and
the network communication connection is a transport connection.

24. The method of claim 23, wherein the device-to-device communication channel comprises at least one of a secure socket layer protocol, a transport layer security protocol, or an encrypted channel using X.509 certificates to authenticate.

25. The method of claim 21, comprising providing sharing information with more than one additional device at a time.

26. The method of claim 21, wherein the first device is a mobile device, and the second device is a display device.

27. The method of claim 21, wherein the plurality of resources comprises at least one of an accelerometer, a sensor interface, a processor core, a headset in communication via a Bluetooth protocol, or an electronic effects pedal in wired communication with an electric guitar device.

28. The method of claim 21, comprising processing information received about an identity of the selected resource from the plurality of resources to be controlled by the second device, the information received about the identity of the selected resource comprising at least one of model number, serial number, or unique resource name.

29. The method of claim 21, comprising:
establishing a device-to-device communication channel with a third device, the third device different from the second device;
receiving, from the third device, a sharing request including a device identifier to identify the third device;
providing, to the third device from the first device, data representative of a plurality of resources, the plurality of resources not locally available to the third device;
indicating a third device selected resource of the plurality of resources; and
sending control instructions to the third device, the control instructions including data derived from the third device selected resource.

30. The method of claim 21, wherein the device identifier comprises at least one of model number, serial number, or unique device name.

* * * * *